(12) United States Patent
Bombacino et al.

(10) Patent No.: US 7,499,975 B1
(45) Date of Patent: Mar. 3, 2009

(54) MAIL SERVER RECIPIENT CHECK SPACE

(75) Inventors: Vinicio Bombacino, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/058,290

(22) Filed: Mar. 28, 2008

(51) Int. Cl.
*G06F 15/16* (2006.01)
*G06F 15/173* (2006.01)

(52) U.S. Cl. .............. 709/206; 709/203; 709/224; 709/225; 709/240

(58) Field of Classification Search .......... 709/203, 709/206, 224, 225, 240, 217, 232
See application file for complete search history.

(56) References Cited

U.S. PATENT DOCUMENTS

| | | | |
|---|---|---|---|
| 6,430,607 B1* | 8/2002 | Kavner | 709/217 |
| 7,257,639 B1 | 8/2007 | Li et al. | |
| 2002/0087642 A1* | 7/2002 | Wei et al. | 709/206 |
| 2005/0060373 A1 | 3/2005 | Ban | |
| 2006/0031305 A1 | 2/2006 | Keohane et al. | |
| 2006/0031309 A1* | 2/2006 | Luoffo et al. | 709/206 |
| 2007/0043866 A1 | 2/2007 | Garbow et al. | |
| 2007/0055735 A1 | 3/2007 | Raghunandan | |
| 2007/0094338 A1* | 4/2007 | Kirkham | 709/206 |

* cited by examiner

*Primary Examiner*—Quang N. Nguyen
(74) *Attorney, Agent, or Firm*—King & Spalding LLP

(57) ABSTRACT

A method of transmitting e-mails wherein the original e-mail is only sent to the recipient servers that serve recipients with enough capacity to receive the original e-mail.

1 Claim, 4 Drawing Sheets

MAIL SERVER RECIPIENT CHECK SPACE

BACKGROUND OF THE INVENTION

1. Field of the Invention

This invention relates to the transmission of e-mails and the management of e-mail traffic such that e-mails are not transmitted from sender's server to recipient's server unless the recipient has the capacity to receive the e-mail.

2. Description of Background

The transmission of e-mail is well known in the art. It is also well known in the art that an e-mail can have attachments that can be sizeable. In the conventional method of e-mail transmission, shown in FIG. 1, a sender addresses 10 an e-mail to certain recipients and the sender's server distributes 11 copies of the e-mail to the servers associated with each recipient. In the conventional method, each recipient's server checks 12 the quota space for its respective client. If distributing the e-mail and any attachments to the client's inbox would cause the inbox to exceed its quota, the recipient's server does not send the e-mail to the recipient's inbox. Instead, the recipient's server sends 13 a message such as "Mail Router Delivery Failure Report" or an equivalent message along with the original e-mail and attachment back to the sender's server. Otherwise, the recipient's server sends 14 the e-mail to the client's inbox.

As can be seen from FIG. 1, this method generates a substantial amount of traffic in both directions between the sender and client's server. The message that cannot be delivered is sent 11 from the sender's server to the intended recipient's server and sent 13 back again.

The conventional method creates excessive traffic between e-mail servers. This traffic causes a burden on the system and waste of resources that can be avoided.

SUMMARY OF THE INVENTION

The shortcomings of the prior art are overcome and additional advantages are provided through the use of a method for sending an e-mail with attachment by determining the size of an original e-mail, storing a copy of the original e-mail, creating a fake e-mail containing size information relating to the size of the original e-mail, transmitting the fake e-mail, determining whether an intended recipient has the capacity to receive the original e-mail by using said size information and recipient's quota, and sending the copy of the original e-mail only to servers that serve those intended recipients that have the capacity to receive the original e-mail.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, network traffic can be significantly reduced by providing that e-mails are only sent to recipient e-mail servers only when the intended recipient has the capacity to receive the e-mails.

BRIEF DESCRIPTION OF THE DRAWINGS

The subject matter which is regarded as the invention is particularly pointed out and distinctly claimed in the claim at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
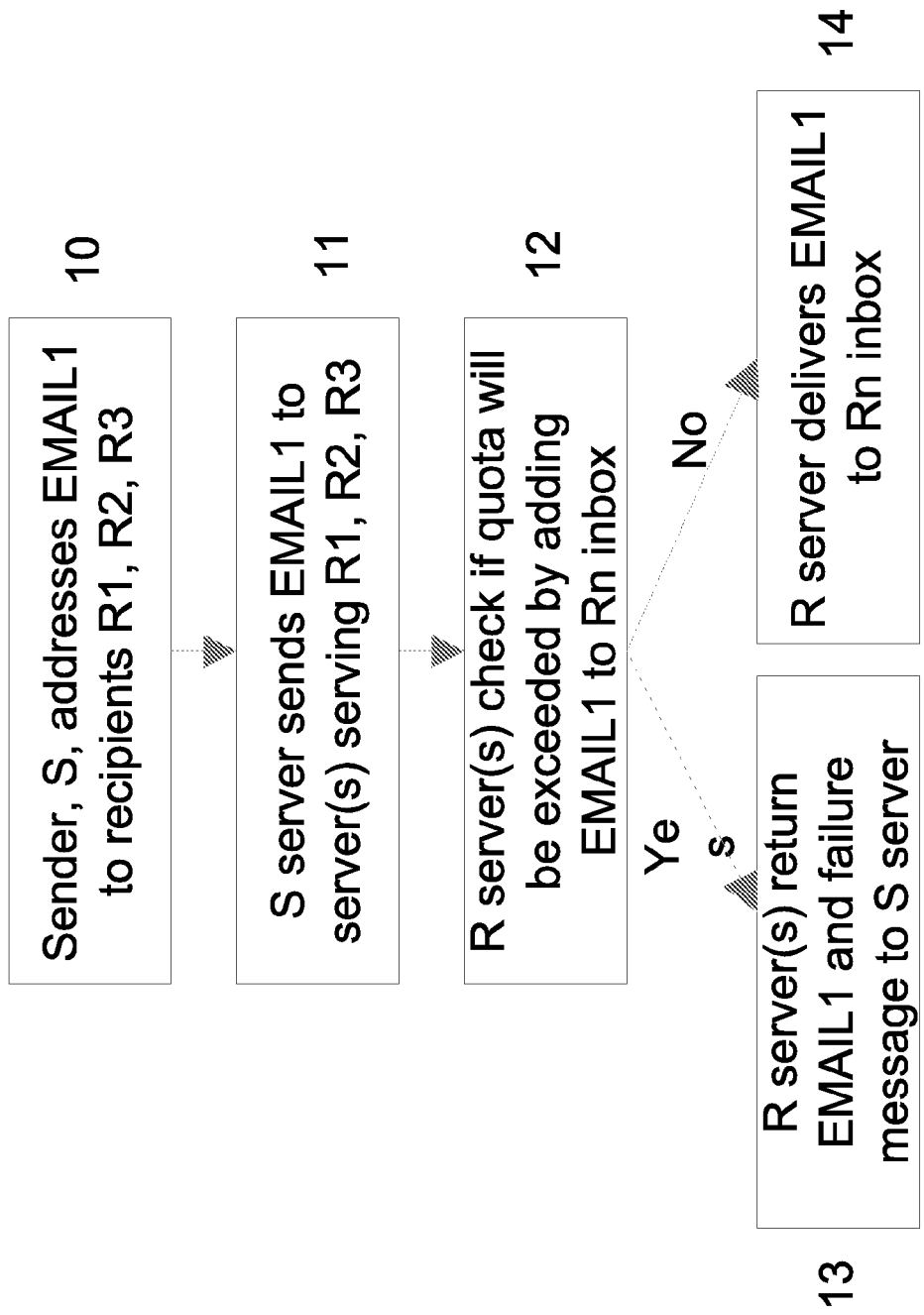
FIG. 1 shows a conventional method of sending e-mail without a recipient capacity check.
Figure 2:
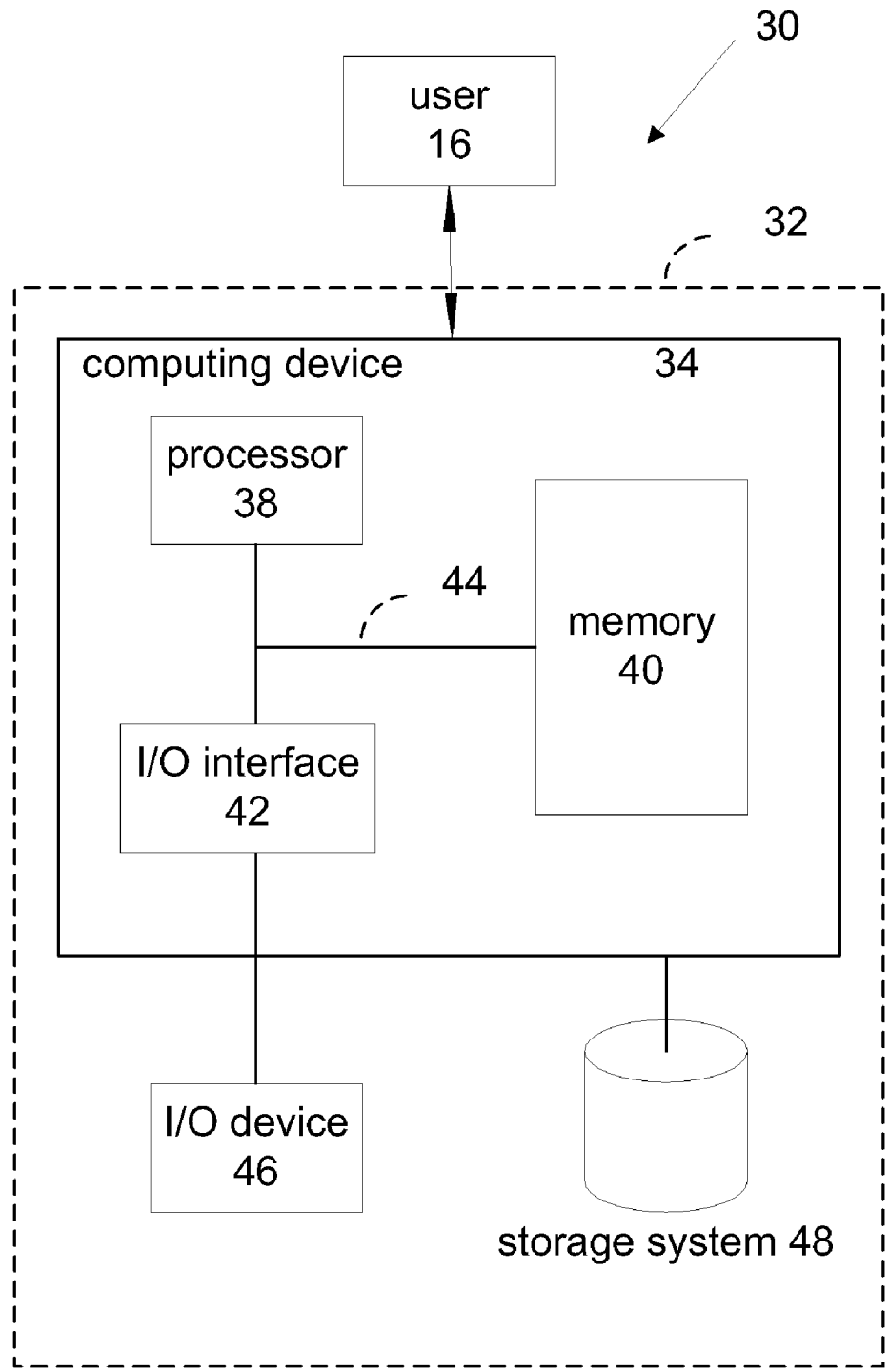
FIG. 2 shows an illustrative example in accordance with the invention.

The invention herein uses a technique wherein e-mails are only sent from sender's server to recipient's server when an intended recipient has the capacity to receive the e-mail with attachment. With reference to the accompanying drawings, FIG. 2 shows an illustrative environment 30 for managing the processes in accordance with the invention. To this extent, the environment 30 includes a computer infrastructure 32 that can perform the processes described herein. In particular, the computer infrastructure 32 is shown including a computing device 34 operable to perform the processes described herein.

The computing device 34 is shown including a processor 38, a memory 40, an input/output (I/O) interface 42, and a bus 44. Further, the computing device 34 is shown in communication with an external I/O device/resource 46 and a storage system 48. As is known in the art, in general, the processor 38 executes computer program code, which is stored in memory 40 and/or storage system 48. While executing computer program code, the processor 38 can read and/or write data, such as the range boundary 50, to/from memory 40, storage system 48, and/or I/O interface 42. The bus 44 provides a communications link between each of the components in the computing device 34. The I/O device 46 can comprise any device that enables an individual to interact with the computing device 34 or any device that enables the computing device 34 to communicate with one or more other computing devices using any type of communications link.

The computing device 34 can comprise any general purpose computing article of manufacture capable of executing computer program code installed thereon (e.g., a personal computer, server, handheld device, etc.). However, it is understood that the computing device 34 is only representative of various possible equivalent computing devices that may perform the processes described herein. Similarly, the computer infrastructure 32 is only illustrative of various types of computer infrastructures for implementing the invention. For example, in one embodiment, the computer infrastructure 32 comprises two or more computing devices (e.g., a server cluster) that communicate over any type of communications link, such as a network, a shared memory, or the like, to perform the process described herein.

Figure 3:
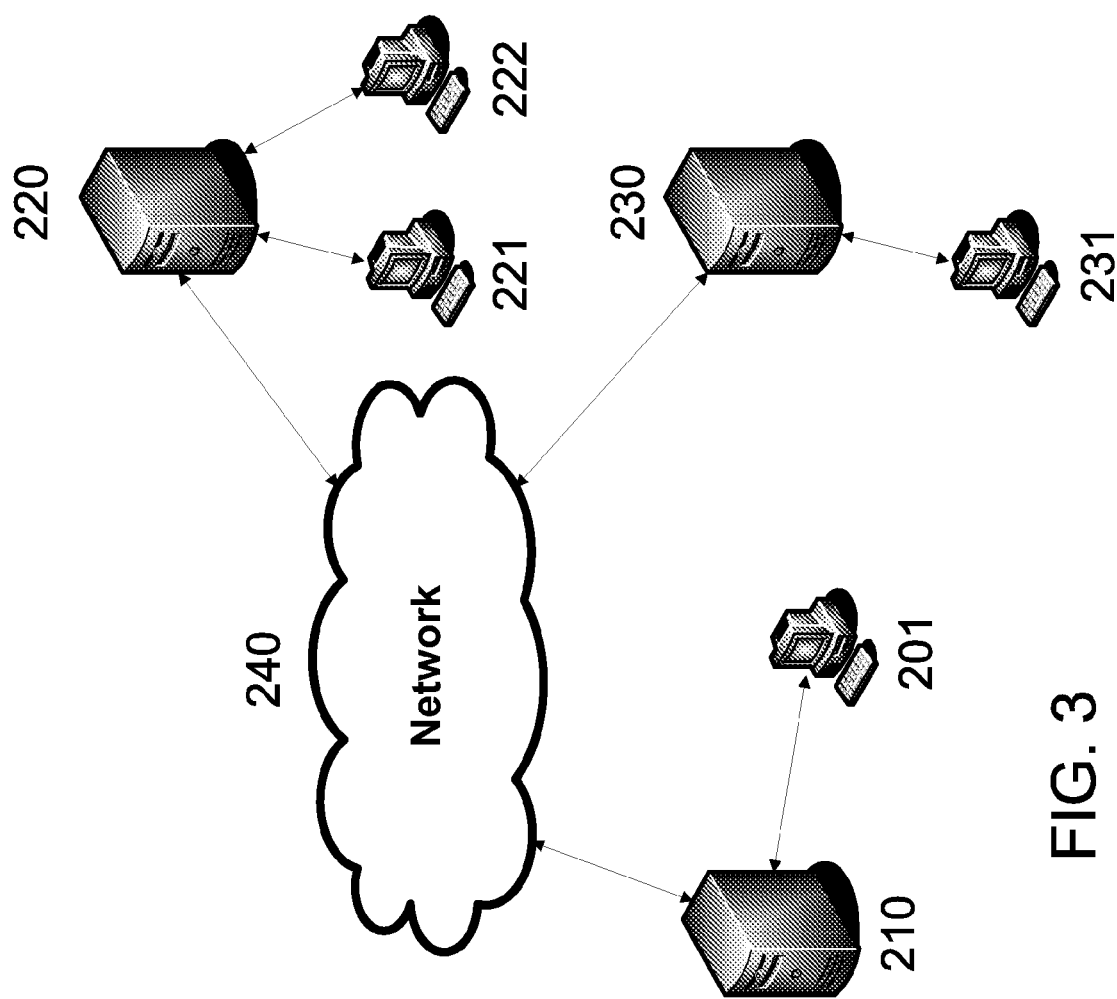
FIG. 3 shows an additional illustrative example in accordance with the invention.
Figure 4:
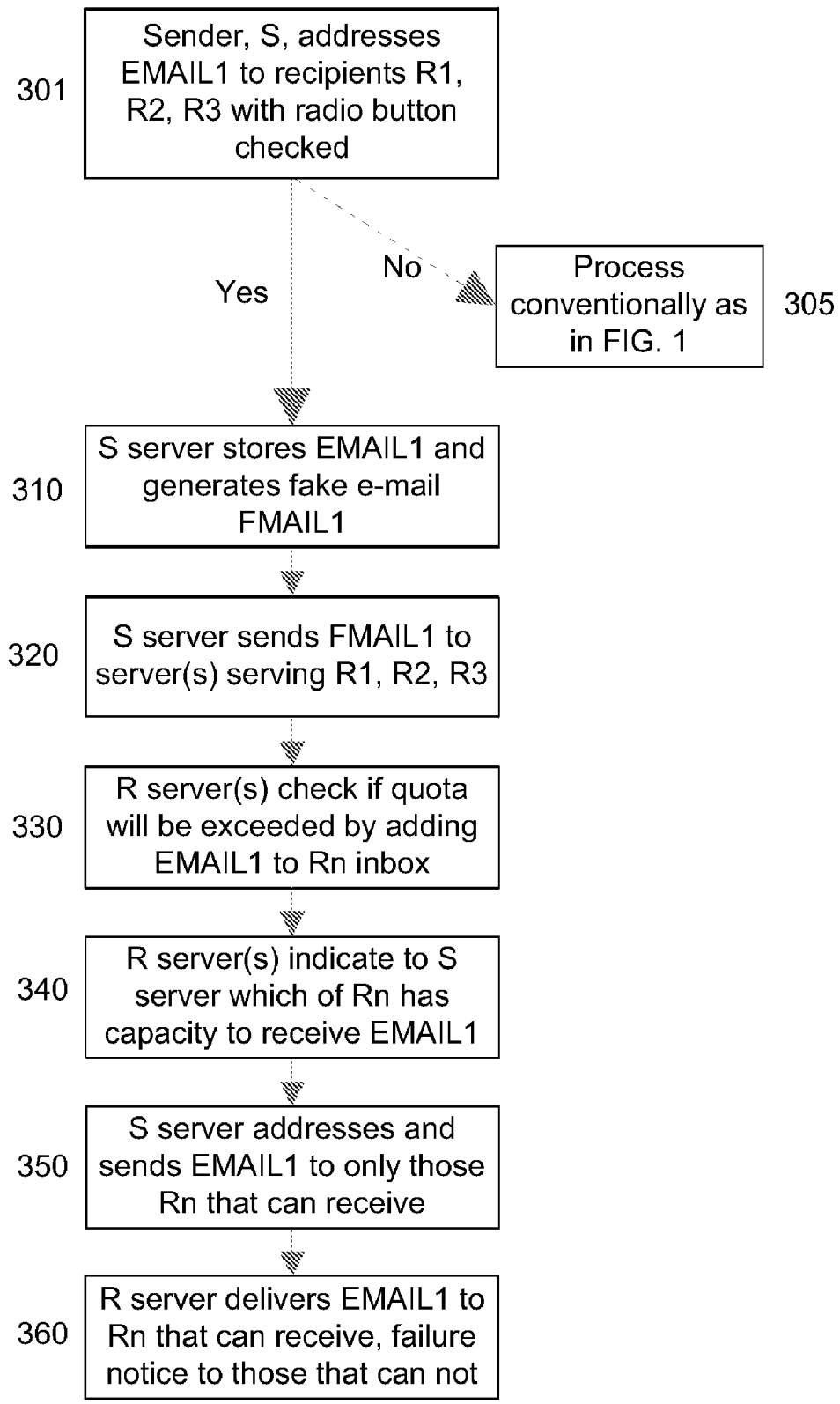
FIG. 4 shows a flow chart illustrating a method of sending e-mail in accordance with the present invention.

A preferred embodiment of the invention is shown in FIGS. 3 and 4. The computing infrastructure depicted in FIG. 3 incorporates the details discussed with respect to FIG. 2. The infrastructure performs the method of the preferred embodiment as follows. A sender 201 initiates the sending 301 of an e-mail EMAIL1 with an attachment of a given size to multiple recipients R1 221, R2 222, R3 231. The configuration of three recipients 221, 222, 231 served by two servers 220, 230 is merely exemplary and any combination is compatible with this invention. The sender 201 has the option of invoking the recipient capacity checking method by use of a radio button. If the sender 201 selects the option, the server does not immediately forward the message and any attachments, but instead it creates 310 a "fake" e-mail FMAIL1 that includes a unique message ID along with the computed size of the original e-mail. In the preferred embodiment, these values are implemented as header fields "uniquekey" and "size" according to the RFC standard. The sender's server 210 also stores 310 a copy of EMAIL1 associated with the uniquekey ID for subsequent use.

The fake e-mail FMAIL1 is sent 320 to each recipient server 220, 230. Each recipient server 220, 230 compares 330 the value of the size field, which is the size of the original e-mail, with the remaining space allocated to the intended recipients it serves. Assume that client 231 would exceed its quota upon receipt of EMAIL1 and that clients 221 and 222 would not. Each recipient server 220, 230 replies 340 to the sender's server 210 indicating the results of the comparison with a message that includes the uniquekey ID.

The sender's server 210 waits to receive the results for each recipient server 220, 230, or for a timeout period to pass. Upon receiving all of the responses, or at the expiration of the timeout period, the sender's server 210 constructs 350 a recipient list of only those recipients 221 and 222 that have the capacity to receive EMAIL1.

The sender's server 210 retrieves the stored copy of EMAIL1, associated by uniquekey, and resends it 350 using the recipient list of only those recipients 221 and 222 that have the capacity to receive EMAIL1. The recipient servers 220, 230 then deliver 360 EMAIL1 to those recipients 221 and 222 with the capacity to receive it and delivers 360 a notification to those recipients 231 that will not receive EMAIL1 due to capacity restrictions.

While the preferred embodiment to the invention has been described, it will be understood that those skilled in the art, both now and in the future, may make various improvements and enhancements which fall within the scope of the claim which follows. This claim should be construed to maintain the proper protection for the invention first described.

What is claimed is:

1. A method for sending an e-mail with attachment from a sender's server to intended recipients, the method comprising:
   determining, by the sender's server, the size of an original e-mail;
   creating, by the sender's server, a fake e-mail containing a uniquekey ID along with size information relating to the size of the original e-mail;
   storing, by the sender's server, a copy of the original e-mail associated with the uniquekey ID at the sender's server;
   transmitting, by the sender's server, the fake e-mail to recipients' servers;
   determining, by the recipients' servers, whether an intended recipient has the capacity to receive the original e-mail by using said size information contained in the fake e-mail and recipient's quota;
   replying, by the recipients' servers, to the sender's server with a message including the uniquekey ID indicating which of intended recipients that have the capacity to receive the original e-mail;
   sending, by the sender's server, said copy of the original e-mail only to the recipients' servers that serve those intended recipients that have the capacity to receive the original e-mail; and
   delivering, by the recipients' servers, said copy of the original e-mail to those intended recipients that have the capacity to receive the original e-mail and a notification to those intended recipients that will not receive the original e-mail due to capacity restrictions.

* * * * *